(12) United States Patent
Maehara

(10) Patent No.: US 8,493,297 B2
(45) Date of Patent: Jul. 23, 2013

(54) OLED DRIVER, LIGHTING APPARATUS EQUIPPED WITH THE DRIVER AND AN ADJUSTMENT METHOD OF THE APPARATUS

(75) Inventor: Minoru Maehara, Matsubara (JP)

(73) Assignee: Panasonic Corporation, Kadoma-shi (JP)

(*) Notice: Subject to any disclaimer, the term of this patent is extended or adjusted under 35 U.S.C. 154(b) by 863 days.

(21) Appl. No.: 12/084,029

(22) PCT Filed: Oct. 24, 2006

(86) PCT No.: PCT/JP2006/321133
§ 371 (c)(1),
(2), (4) Date: Apr. 24, 2008

(87) PCT Pub. No.: WO2007/049599
PCT Pub. Date: May 3, 2007

(65) Prior Publication Data
US 2009/0046087 A1    Feb. 19, 2009

(30) Foreign Application Priority Data
Oct. 26, 2005  (JP) .................................. 2005-311973

(51) Int. Cl.
*G09G 3/30*  (2006.01)
(52) U.S. Cl.
USPC ................................ 345/77; 345/76; 345/211
(58) Field of Classification Search
USPC .......................................................... 345/211
See application file for complete search history.

(56) References Cited

U.S. PATENT DOCUMENTS

| | | | |
|---|---|---|---|
| 4,633,141 A | 12/1986 | Weber | |
| 5,027,040 A | 6/1991 | Ikeda et al. | |
| 6,008,588 A * | 12/1999 | Fujii | 315/169.3 |
| 6,144,165 A | 11/2000 | Liedenbaum | |
| 6,400,343 B1 * | 6/2002 | Zorzan et al. | 345/60 |
| 6,456,016 B1 | 9/2002 | Sundahl et al. | |
| 6,727,660 B1 | 4/2004 | Heller | |
| 6,809,472 B1 * | 10/2004 | Carter et al. | 313/504 |
| 6,844,760 B2 * | 1/2005 | Koharagi et al. | 327/110 |

(Continued)

FOREIGN PATENT DOCUMENTS

| | | |
|---|---|---|
| JP | 02-256191 | 10/1990 |
| JP | 3-215491 A | 9/1991 |

(Continued)

OTHER PUBLICATIONS

Korean Official Action dated Nov. 16, 2009 issued in Korean Patent Application No. 10-2008-7010116.

(Continued)

*Primary Examiner* — Amare Mengistu
*Assistant Examiner* — Sarvesh J Nadkarni
(74) *Attorney, Agent, or Firm* — Edwards Wildman Palmer LLP; James E. Armstrong, IV; George N. Chaclas

(57) ABSTRACT

An OLED driver for driving at least one organic electroluminescence element, lighting apparatus equipped with the driver and an adjustment method of the apparatus. The driver has a square-wave voltage source and a controller. The source generates square-wave voltage and applies the voltage to the element. The controller controls the source so as to change the frequency of the voltage to change and adjust light output of the element.

16 Claims, 5 Drawing Sheets

U.S. PATENT DOCUMENTS

| | | | |
|---|---|---|---|
| 7,088,145 B2 * | 8/2006 | Baude et al. | 326/121 |
| 7,196,679 B2 * | 3/2007 | Jang et al. | 345/60 |
| 7,321,350 B2 * | 1/2008 | Lee et al. | 345/89 |
| 7,382,339 B2 | 6/2008 | Sempel | |
| 7,642,805 B1 * | 1/2010 | Yinn et al. | 324/760.01 |
| 7,880,400 B2 * | 2/2011 | Zhou et al. | 315/247 |
| 7,899,659 B2 * | 3/2011 | Tester | 703/14 |
| 2004/0066363 A1 * | 4/2004 | Yamano et al. | 345/98 |
| 2004/0160168 A1 * | 8/2004 | Lee et al. | 313/500 |
| 2005/0174064 A1 * | 8/2005 | Agostinelli et al. | 315/169.3 |
| 2005/0225516 A1 | 10/2005 | Sempel | |
| 2006/0055639 A1 * | 3/2006 | Yamada | 345/77 |
| 2009/0295778 A1 * | 12/2009 | Maehara et al. | 345/213 |

FOREIGN PATENT DOCUMENTS

| | | |
|---|---|---|
| JP | H3-214591 | 9/1991 |
| JP | 10-199674 | 7/1998 |
| JP | 2000-30862 | 1/2000 |
| JP | 2002-244612 A | 8/2002 |
| JP | 2003-501795 | 1/2003 |
| JP | 3432986 | 5/2003 |
| JP | 2003-202831 A | 7/2003 |
| JP | 2003-302939 | 10/2003 |
| JP | 2004-246322 | 9/2004 |
| JP | 2005-78828 | 3/2005 |
| KR | 10-2005-0006247 | 1/2005 |

OTHER PUBLICATIONS

Supplementary European Search Report for EP Application No. 06822113.4 issued Oct. 21, 2010.
International Search Report, dated Dec. 26, 2006.
Chinese Official Action for Chinese Patent Application No. 200680039849.3 issued Jul. 25, 2011.
Japanese Official Action dated Oct. 16, 2012 issued in Japanese Patent Application No. 2005-311973.
Japanese Office Action issued on Mar. 26, 2013 in corresponding Japanese patent application No. 2012-012607.

* cited by examiner

OLED DRIVER, LIGHTING APPARATUS EQUIPPED WITH THE DRIVER AND AN ADJUSTMENT METHOD OF THE APPARATUS

CROSS REFERENCE TO RELATED APPLICATIONS

This application is related to co-pending application: "AN OLED DRIVER AND LIGHTING APPARATUS EQUIPPED WITH THE SAME" filed even date herewith in the name of Minoru MAEHARA as a national phase entry of PCT/JP2006/321146, which application is assigned to the assignee of the present application and is incorporated by reference herein.

TECHNICAL FIELD

The invention relates to generally OLED drivers and more particularly to an OLED driver for driving at least one organic electroluminescence element, lighting apparatus equipped with the driver, and an adjustment method used for manufacturing process of the apparatus.

BACKGROUND ART

In this sort of lighting apparatus, at least one organic electroluminescence element is driven at low drive voltage (e.g., approximately a few to 10s V) in comparison with discharge lamps. The element is hereinafter also referred to as an organic EL element or an OLED (Organic Light Emitting Diode). Accordingly, since OLED drivers can be produced at low cost in comparison with prior art ballasts, various OLED drivers have been proposed.

For example, Japanese Patent Publication No. 2005-78828 discloses lighting apparatus. The apparatus includes an organic EL element(s), a converting means, a switching means and a controlling means. The converting means is formed of a full wave rectifying circuit and a smoothing circuit, and converts alternating-current power into direct-current power. The switching means has four transistors constituting a full-bridge circuit. The switching means also produces an alternating electric current from the direct-current power to supply the element with a forward direction current and a reverse direction current alternately. The controlling means turns the transistors on and off based on an electric current flowing through the element. For example, the controlling means adjusts a duty ratio with respect to the transistors in accordance with a designated luminance value. Specifically, in case that the luminance is raised, the duty ratio is increased so as to lengthen a supply time of the forward direction current to the element. Conversely, in case that the luminance is lowered, the duty ratio is decreased so as to shorten a supply time of the forward direction current to the element.

Japanese Patent No. 3432986 discloses an organic EL display device. Before applying emission drive voltage to an organic EL element, the device applies auxiliary voltage to the element. The auxiliary voltage is lower than the emission drive voltage and higher than barrier voltage of the element.

In order to realize lighting control (dimming), the apparatus described in Japanese Patent Publication No. 2005-78828 adjusts the duty ratio while keeping the frequency of the full-bridge circuit constant. Accordingly, the circuit structure of the controlling means becomes complicated.

DISCLOSURE OF THE INVENTION

It is an object of the present invention to realize an OLED driver of comparatively simple circuit structure in order to dimm at least one organic electroluminescence element.

In order to drive at least one organic electroluminescence element, an OLED driver of the present invention comprises a square-wave voltage source and a controller. The source generates square-wave voltage of which polarity is periodically inverted and which is approximately equal to drive voltage of the element, and then applies the voltage to the element. The controller controls the source so as to change the frequency of the voltage to change and adjust light output of the element. In general, the effective value of an electric current flowing through an element in response to sinusoidal-wave voltage is given by $Im/\sqrt{2}$ when Im is the maximum value of the current amplitude. Accordingly, even if the frequency of voltage applied to the element is changed, the effective value does not change. As against this, when driving the element by square-wave voltage, the invention changes the frequency of the square-wave voltage based on a theory. The theory is that the effective value of an electric current flowing through the element varies in response to frequency change of the square-wave voltage applied to the element. Thus, by utilizing the theory, it is possible to realize an OLED driver of comparatively simple circuit structure.

In an aspect of the present invention, the driver further comprises a detector that substantially detects a value of the electric current flowing through the element. And based on the value of the electric current, the controller changes the frequency of the voltage so that the value of the electric current flowing through the element agrees with a target electric current value. In case of this driver, it is possible to easily correct dispersion among organic electroluminescence elements in light output characteristic.

In another aspect of the present invention, the driver further comprises an accumulator that accumulates an operation time of the element to obtain an accumulated operation time. And the controller more lowers the frequency of the square-wave voltage as the accumulated operation time is more increased. In this invention, decline of light output of the element caused by increase of the accumulated operation time is restrained based on a theory that light output of the element more increases as the frequency of the square-wave voltage is more lowered.

Lighting apparatus of the present invention comprises said OLED driver and the at least one organic electroluminescence element.

An adjustment method used for manufacturing process of said lighting apparatus, of the present invention comprises changing and adjusting the frequency of the square-wave voltage so that light output of the element substantially agrees with specified light output based on a characteristic of the element.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
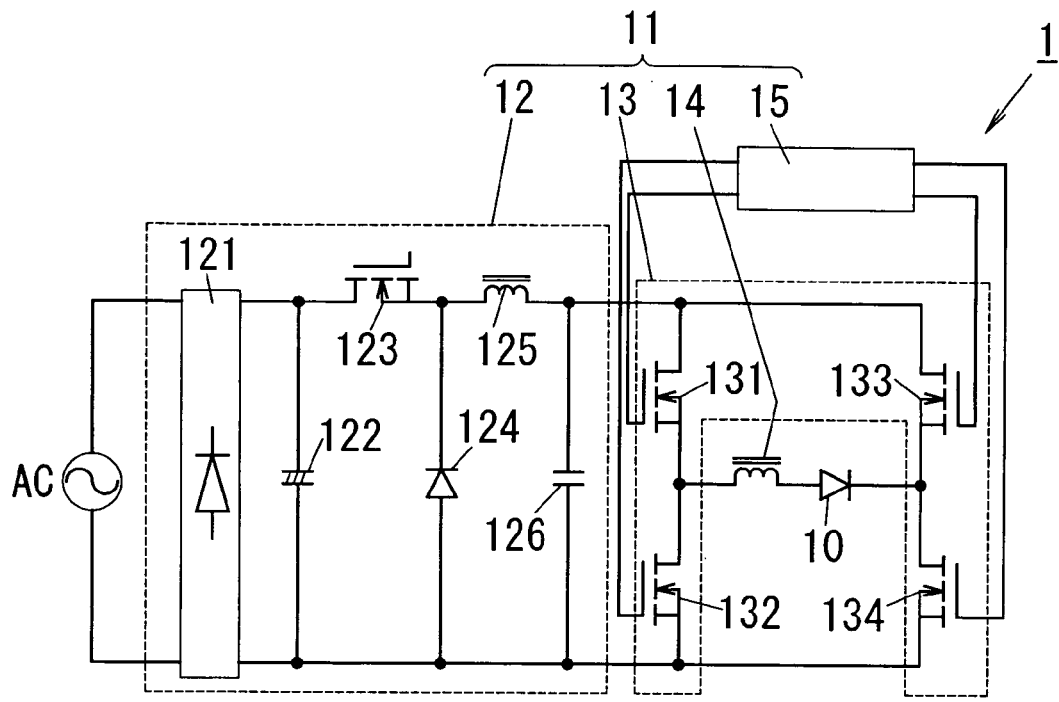
FIG. 1 is a circuit diagram of a first embodiment according to the present invention.

FIG. 1 shows a first embodiment according to the present invention, namely lighting apparatus 1. The apparatus 1 has at least one organic EL element (OLED) 10 and an OLED driver 11 for driving the element 10. The organic EL element 10 is formed of an emission layer (an organic thin film) and a pair of electrodes between which the layer is sandwiched from the both surfaces of the layer. The element 10 emits light when electrons injected from one electrode as a cathode recombine with holes injected from other electrode as an anode in the layer.

The OLED driver 11 has a square-wave voltage source that is formed of a direct-current power source 12, a polarity inversion circuit (inverter) 13 and a current-limiting element 14 as well as having a controller 15. The driver generates square-wave voltage to apply the voltage to the element 10.

The direct-current power source 12 is configured to operate in accordance with a first control of the controller 15 (e.g., a PWM control signal) and then to convert alternating-current power of a commercial power source AC into direct-current power so that its output voltage becomes approximately equal to (emission) drive voltage of the element 10. For example, as shown in FIG. 1, the source 12 is provided with a diode bridge 121 as a full wave rectifier, a smooth capacitor 122 and a voltage step down converter. The smooth capacitor is connected between both output terminals of the bridge 121. The voltage step down converter is connected to both ends of the capacitor 122. The converter is formed of: a switching element (e.g., MOSFET) 123, a diode 124, an inductor 125 and a capacitor 126. One end of the switching element is connected to the positive terminal of the capacitor 122. The cathode and anode of the diode are respectively connected to the other end of the element 123 and the negative terminal of the capacitor 122. One end of the inductor is connected to the other end of the element 123. The capacitor 126 is connected between the other end of the inductor 125 and the anode of the diode 124. In this source 12, the alternating-current power of the source AC is rectified into pulsating direct current power through the bridge 121, and the voltage of the pulsating direct current power is smoothed through the capacitor 122. The smoothed voltage is then converted into voltage approximately equal to the drive voltage of the element 10 through the converter, and said direct-current power is obtained.

The polarity inversion circuit 13 is configured to operate in accordance with a second control of the controller 15 (e.g., switching control signals each of which has a variable frequency) and then to apply the square-wave voltage to the element 10. That is, the circuit 13 periodically inverts voltage polarity of the direct-current power from the source 12 and then generates square-wave voltage. This voltage is applied to the element 10 via the element 14 for limiting a peak value of the inrush current when the polarity is inverted (e.g., an inductor with current-limiting action). For example, the circuit 13 is provided with four switching elements (e.g., MOSFETs) 131-134 constituting a full-bridge circuit.

The controller 15 is formed of e.g., an oscillator including a VCO (Voltage Controlled Oscillator), drive circuits for the source 12 and the circuit 13, a control circuit (e.g., various ICs and/or a Micon, etc.) and so on. The controller also performs the first control, the second control and so on. For example, in case of the first control, the controller 15 detects output voltage of the source 12 (the voltage across the capacitor 126) through a detector (not shown). Based on the detected voltage, the controller 15 then generates a PWM control signal so that the output voltage of the source 12 becomes approximately equal to the drive voltage of the element 10. The controller then supplies the signal to the control terminal (gate) of the element 123.

In case of the second control, the controller 15 supplies the elements 131-134 with switching control signals so that the circuit 13 periodically inverts voltage polarity of the direct-current power from the source 12 to generate square-wave voltage. Each of the switching control signals has, for example, a frequency corresponding to any of the rated output and each dimming output. Specifically, forward direction control and reverse direction control are repeated alternately and periodically. In case of the forward direction control, the controller 15 supplies the elements 131 and 134 with turn-on signals and also supplies the elements 132 and 133 with turn-off signals. In case of the reverse direction control, the controller 15 supplies the elements 131 and 134 with turn-off signals and also supplies the elements 132 and 133 with turn-on signals.

Moreover, in the second control, the controller 15 controls the circuit 13 so as to change the frequency of the square-wave voltage to change and adjust light output of the element 10, based on a light output value. For example, the light output value is decided in accordance with instructions through operating keys (not shown, e.g., a dimmer). That is, the controller 15 supplies the elements 131-134 with the switching control signals each of which has a frequency changed in accordance with the instructions. Expanding on this, as shown in FIG. 2, the frequency of the square-wave voltage is changed based on a theory that the effective value Irm of an electric current flowing through the element 10 varies in response to a frequency change of the square-wave voltage applied to the element 10 (cf. f0-f1-f2).

Figure 2:
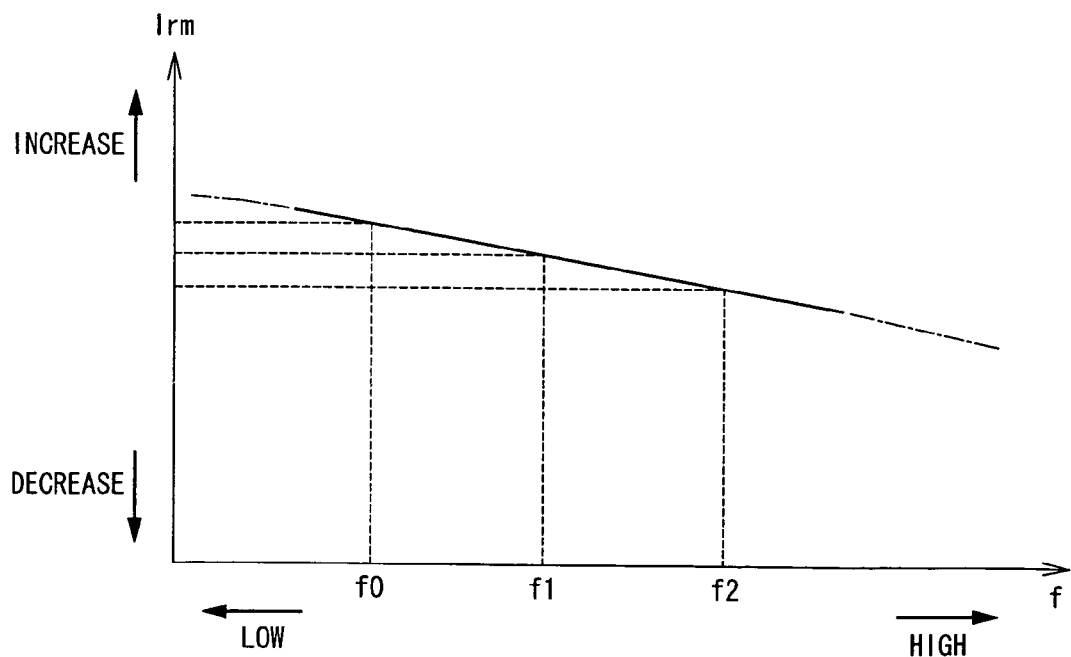
FIG. 2 is an explanatory diagram of operation theory of the first embodiment.
Figure 3:
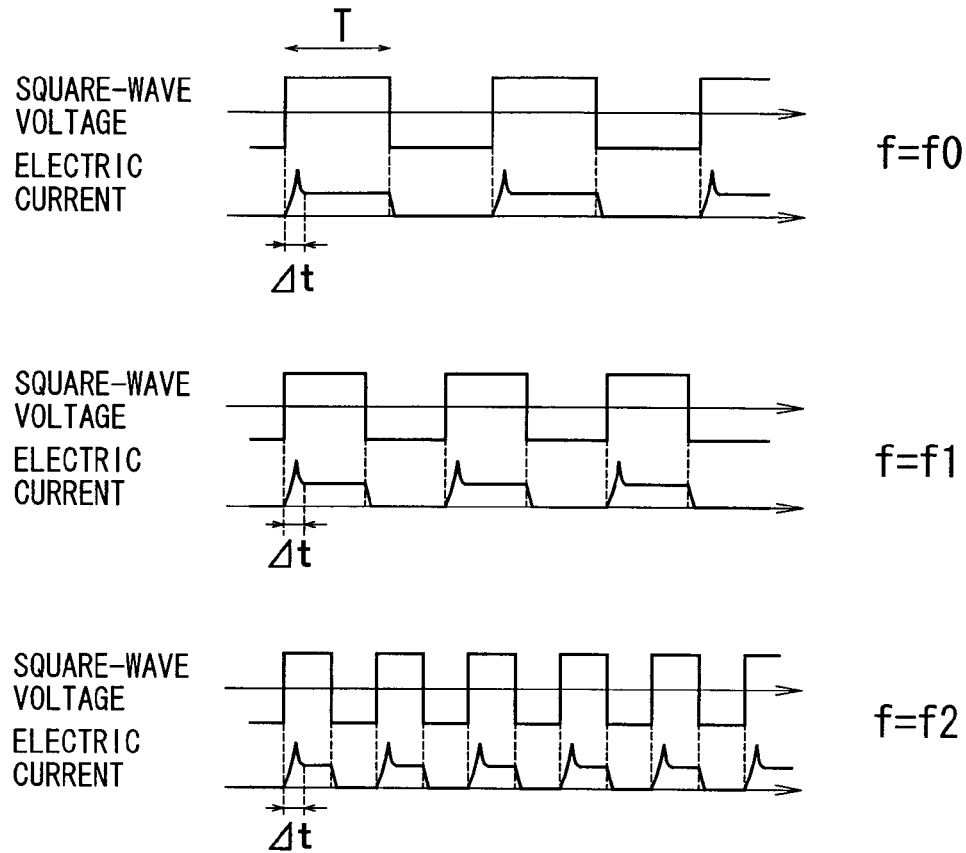
FIG. 3 is an explanatory diagram of operation theory of the first embodiment.

It is supposed that a cause of the characteristic of FIG. 2 has a relationship with a ratio of a term T of the forward direction control to a term Δt for which an inrush current is flowing, as shown in FIG. 3. That is, the element 10 has a capacity component owing to the structure and therefore has the circuit structure that the capacity component is connected in parallel thereto. Because of this, an inrush current flows through the element 10 from the beginning time point of the term T. But the term Δt is almost decided by the capacity component and therefore is nearly constant without depending on the frequency of the square-wave voltage. In such a structure, it is thought that the term T becomes shorter as the frequency f of the square-wave voltage is more raised, and then the ratio of the term Δt to the term T is increased, so that the effective value Irm is decreased.

The operation of the first embodiment is explained. When the driver 11 is activated, the controller 15 supplies a PWM control signal to the element 123 of the source 12. The controller also supplies the elements 131-134 with switching control signals each of which has, for example, a frequency corresponding to any of the rated output (e.g., f0) and each dimming (e.g., f1 and f2). Accordingly, the element 10 operates at the light output corresponding to the frequency.

Subsequently, when instructions for changing said light output to another light output is given through the operating keys, the controller 15 maintains the supply of the PWM control signal to the element 123. The controller 15 also controls the circuit 13 so as to change the frequency of the square-wave voltage to change and adjust light output of the element 10 based on a light output value decided in accordance with the instructions. Accordingly, the element 10 operates at the light output corresponding to the light output value.

In cases of the first embodiment, the light output of the element 10 can be changed by simply changing the frequency of the square-wave voltage. Accordingly, it is possible to realize an OLED driver of comparatively simple circuit structure in comparison with the prior art control (adjustment of duty ratio) described in Japanese Patent Publication No. 2005-78828. In addition, since the output of the direct-current power source 12 is constant, the control of the source 12 becomes simple.

Figure 4:
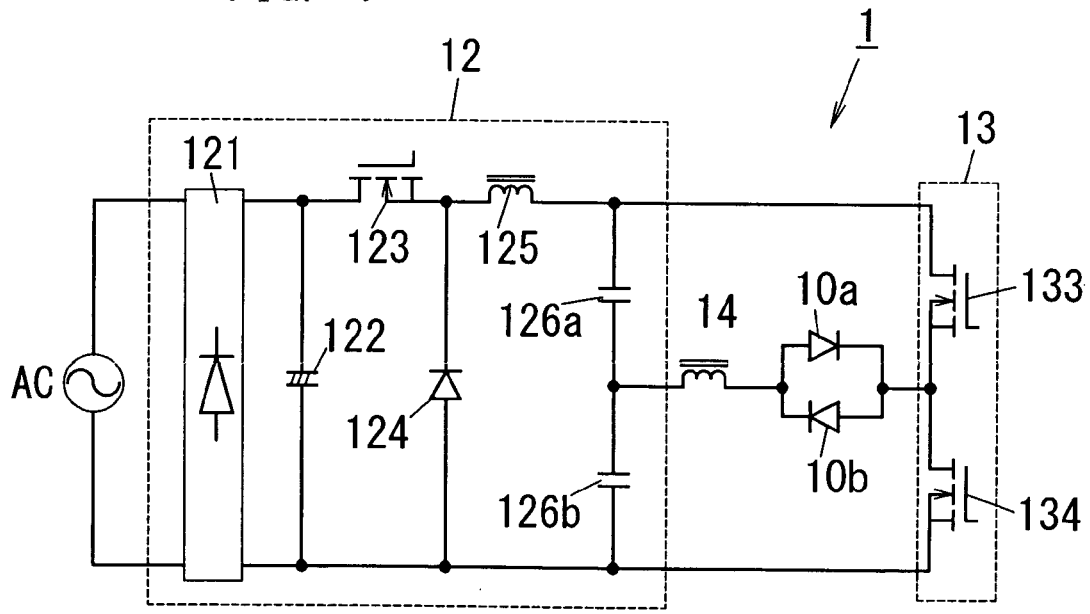
FIG. 4 is a circuit diagram of a modified embodiment.

In a modified embodiment, as shown in FIG. 4, the lighting apparatus 1 has a modified direct-current power source 12 and a half-bridge type of polarity inversion circuit 13. The apparatus also drives a pair of elements 10a and 10b connected in inverse-parallel with each other in stead of the element 10. Specifically, the source 12 has capacitors 126a and 126b connected in series with each other instead of the capacitor 126. The circuit 13 is formed of switching elements (e.g., MOSFETs) 133 and 134, and these elements are alternately turned on and off. For example, when the elements 133 and 134 are respectively turned on and off, the positive polarity voltage is applied to the element 10b and a forward direction current flows through the element 10b. The reverse polarity voltage is also applied to the element 10a from the capacitor 126a. When the elements 133 and 134 are respectively turned off and on, the positive polarity voltage is applied to the element 10a and a forward direction current flows through the element 10a. The reverse polarity voltage is also applied to the element 10b from the capacitor 126b. Also in this case, square-wave voltage of which polarity is inverted is applied to each of the elements 10a and 10b. In case of this apparatus 1, since the elements 10a and 10b emit light alternately, luminous efficiency can be increased.

Figure 5:
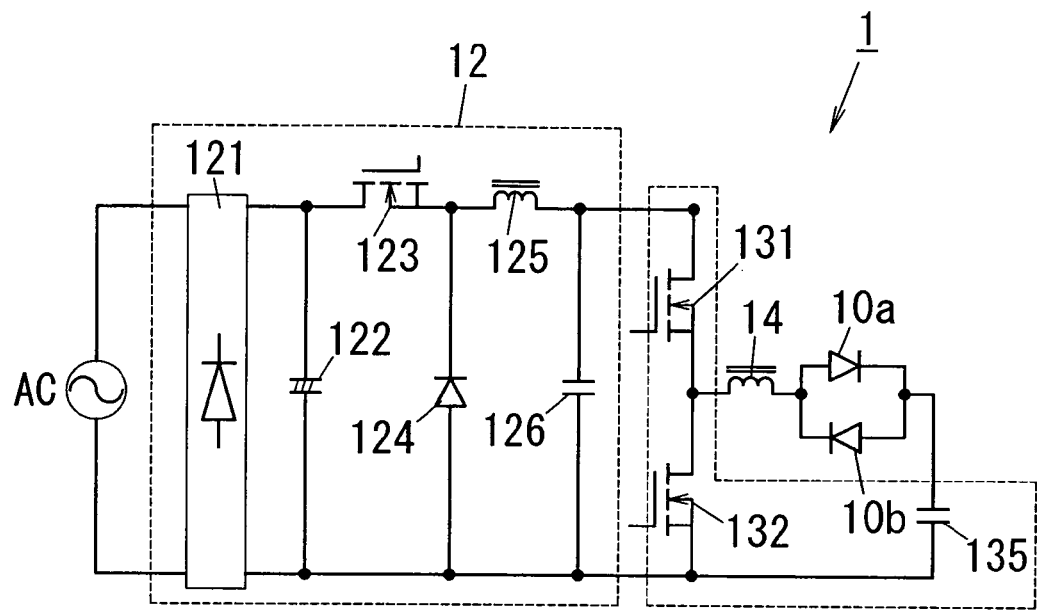
FIG. 5 is a circuit diagram of another modified embodiment.

In another modified embodiment, as shown in FIG. 5, the lighting apparatus 1 has a half-bridge type of polarity inversion circuit 13. The apparatus drives a pair of elements 10a and 10b connected in inverse-parallel with each other in stead of the element 10. The circuit 13 is formed of switching elements (e.g., MOSFETs) 131 and 132 and a capacitor 135, and the elements 131 and 132 are alternately turned on and off. For example, when the elements 131 and 132 are respectively turned on and off, the positive polarity voltage is applied to the element 10a and a forward direction current flows through the element 10a. The reverse polarity voltage is also applied to the element 10b. At this point, the capacitor 135 is charged by the forward direction current. When the elements 131 and 132 are respectively turned off and on, the positive polarity voltage is applied to the element 10b from the capacitor 135 and a forward direction current flows through the element 10b. The reverse polarity voltage is also applied to the element 10a from the capacitor 135. Also in this case, the square-wave voltage of which polarity is inverted is applied to each of the elements 10a and 10b. In case of this apparatus 1, luminous efficiency can be increased.

Figure 6:
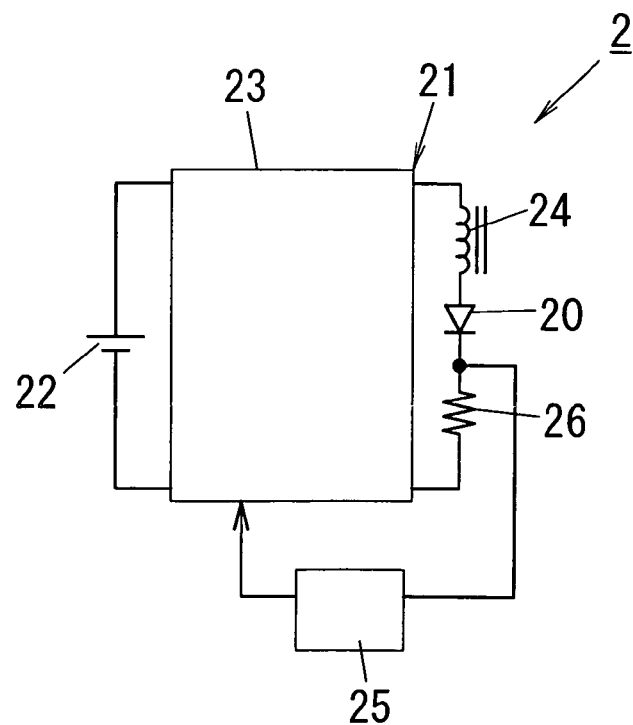
FIG. 6 is a schematic diagram of a second embodiment according to the present invention.

FIG. 6 shows a second embodiment according to the present invention, namely lighting apparatus 2. The apparatus 2 has at least one organic EL element 20 and an OLED driver 21 for driving the element 20. The driver 21 has a direct-current power source 22, a polarity inversion circuit 23 and a current-limiting element 24 like those of the first embodiment. The driver also has a detector 26 and a controller 25 as an aspect of the second embodiment.

The detector 26 is configured to substantially detect a value of the electric current flowing through the element 20. For example, as shown in FIG. 6, the detector 26 is formed of a resistor connected in series with the element 20, and detects the voltage across the resistor as an electric current flowing through the element 20.

Figure 7:
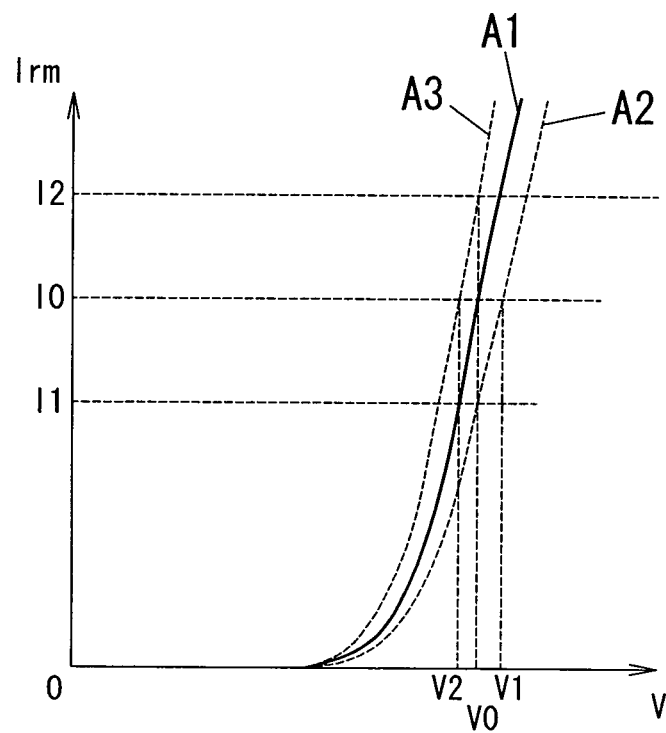
FIG. 7 illustrates characteristic curve of an organic electroluminescence element.

The controller 25 further performs the control for correcting dispersion among organic EL elements in light output characteristic, in addition to each control like the first embodiment. That is, the controller 25 adjusts the frequency of the square-wave voltage so that a value of the electric current flowing through the element 20 agrees with a target electric current value, based on a value of the electric current detected with the detector 26. In general, organic EL elements have dispersion among each other in the electric current (current-voltage characteristic) in response to the applied voltage as shown in A1, A2 and A3 of FIG. 7. Herein, A1 shows an average characteristic that a specified electric current I0 flows in response to specified drive voltage V0. A2 and A3 show dispersion characteristics that electric currents I1 and I2 flow in response to the specified drive voltage V0, respectively. Thus, in case that organic EL elements have the dispersion characteristic, luminance of the elements become different luminance from that of the average characteristic.

Figure 8:
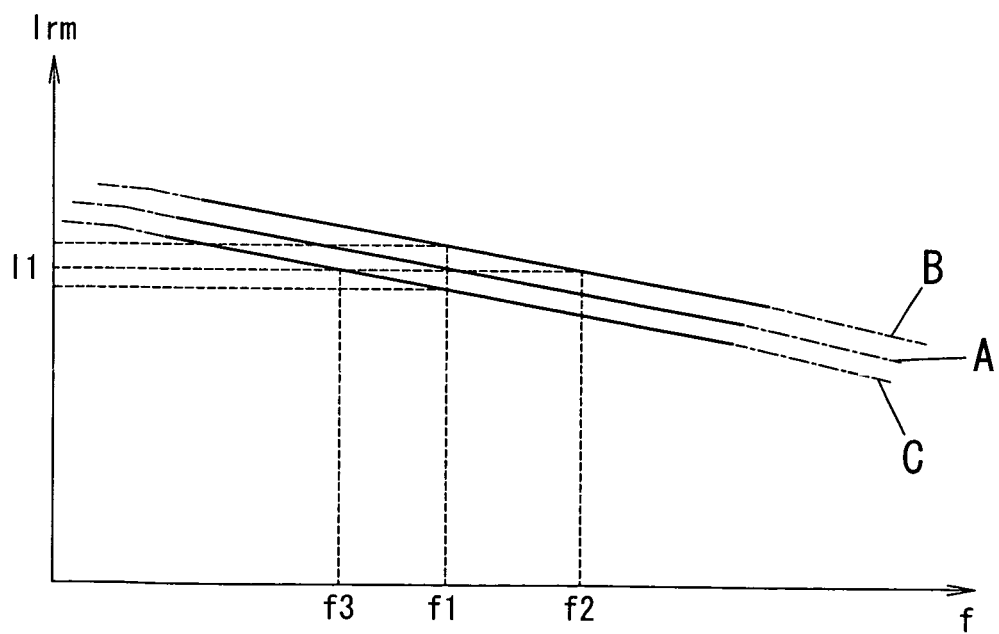
FIG. 8 is an explanatory diagram of operation of the second embodiment.

Therefore as shown in FIG. 8, in the second embodiment, luminance of each apparatus 2 is kept constant. That is, the apparatus 2 changes the frequency of the square-wave voltage so that a value of the electric current flowing through the element 20 agrees with a target electric current value I1, based on a value of the electric current detected with the detector 26. For example, when the element 20 has the characteristic A, the frequency of the square-wave voltage is adjusted to f1. As against this, the frequency of the square-wave voltage is adjusted to f2 when the element 20 has the characteristic B, while the frequency of the square-wave voltage is adjusted to f3 when the element 20 has the characteristic C. For example, in case that the element 20 is not replaceable, characteristic of each individual element 20 is inspected on production and thereby the frequency of the In case of the second embodiment, it is possible to easily correct dispersion among organic EL elements in the light output characteristic (current-voltage characteristic).

Figure 9:
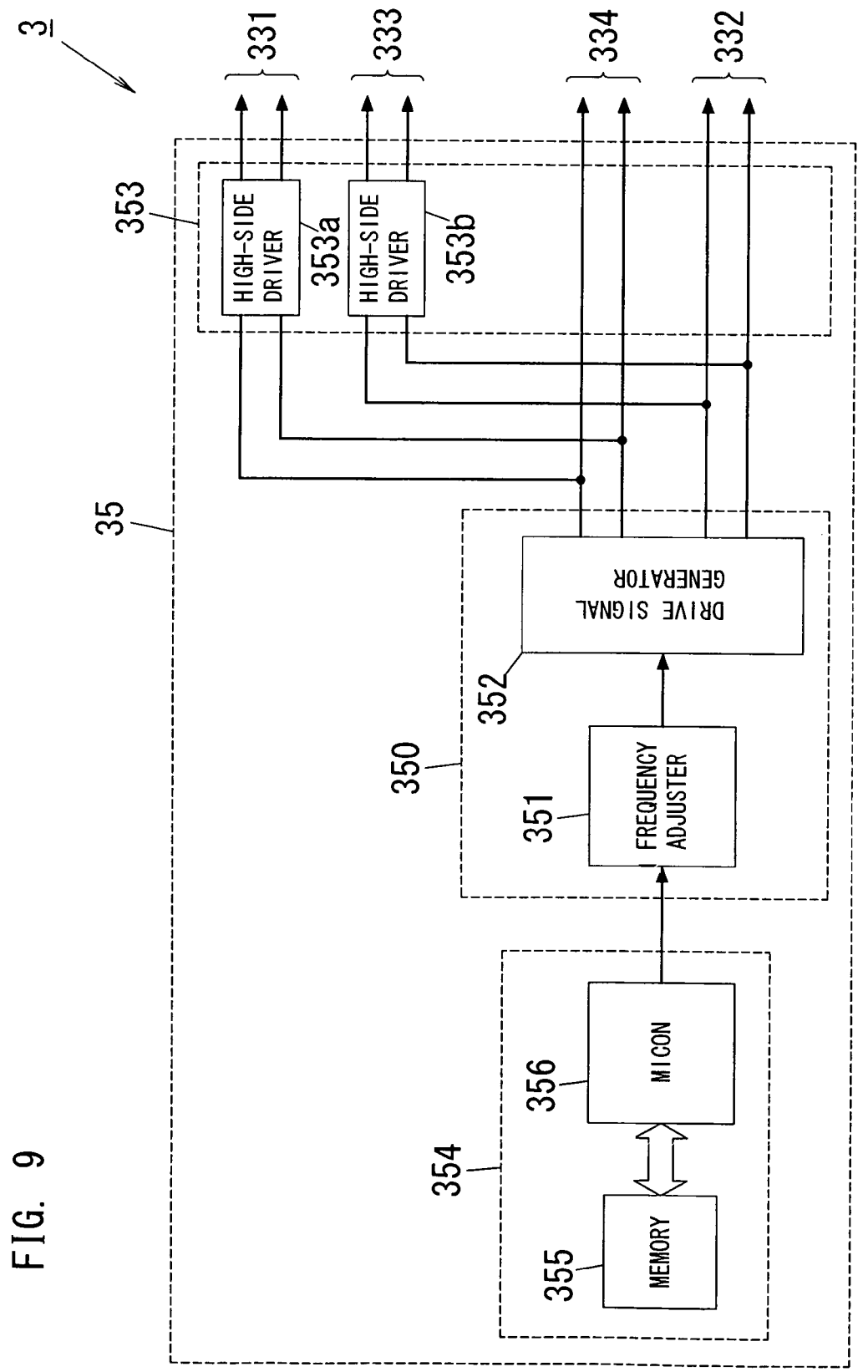
FIG. 9 is a block diagram of a part of lighting apparatus in a third embodiment according to the present invention.

FIG. 9 shows a third embodiment according to the present invention, namely a part of lighting apparatus 3 (a controller 35). An OLED driver of the apparatus 3 has a direct-current power source, a polarity inversion circuit and a current-limiting element like those of the first or the second embodiment. In FIG. 9, 331-334 represent drive signals to four switching elements constituting a full-bridge circuit in the polarity inversion circuit. And as an aspect of the third embodiment, the driver has a controller 35 that corrects decline of light output of an organic EL element caused by increase of the accumulated operation time, in addition to each control like the first or the second embodiment.

The controller 35 has an oscillator 350, a drive circuit 353 and an accumulator 354. The oscillator is formed of a frequency adjuster 351 and a drive signal generator (e.g., VCO, etc.) 352. The drive circuit is formed of high-side drivers 353a and 353b. The accumulator is formed of a memory 355 and micon 356. The oscillator 350 and the drive circuit 353 can be applied to the first and second embodiments as well.

The adjuster 351 adjusts the frequency of square-wave voltage to the frequency corresponding to control data from the accumulator 354. The generator 352 generates a drive signal in response to the adjusted frequency. The circuit 353 supplies the drive signal to each of the elements 332 and 334. The drivers 353a and 353b of the circuit 353 also generate inverse drive signals to the drive signal from the generator 352 and then supply the inverse drive signals to the elements 331 and 333, respectively. The accumulator 354 accumulates an operation time of the organic EL element to calculate an accumulated operation time, and stores the accumulated operation time in the memory 355. The accumulator 354 also retrieves the accumulated operation time from the memory 355 whenever activated, and supplies the adjuster 351 with the control data for more lowering the frequency of the square-voltage as the accumulated operation time is more increased.

In case of the third embodiment, decline of light output of the organic EL element caused by increase of the accumulated operation time is restrained based on a theory that light output of the element more increases as the frequency of the square-wave voltage is more lowered (cf. FIG. 2). In the example of FIG. 2, the initial frequency is set to, e.g., f1 or f2 higher than f0.

Although the present invention has been described with reference to certain preferred embodiments, numerous modifications and variations can be made by those skilled in the art without departing from the true spirit and scope of this invention. For example, the lighting apparatus of the present invention may have three or more organic EL elements connected in series of parallel with each other.

The invention claimed is:

1. An OLED driver for driving at least one organic electroluminescence element, comprising:
   a square-wave voltage source that generates a square-wave voltage of which polarity is periodically inverted and applies the voltage to the element, said voltage being approximately equal to a drive voltage of the element;
   a controller that controls the source so as to change the frequency of the voltage to change and adjust a light output of the element; and
   a detector that is connected in series with the element and substantially detects a value of an electric current flowing through the element,
   wherein, based on the value of the electric current, the controller changes the frequency of the voltage so that the value of the electric current flowing through the element agrees with a target electric current value,
   wherein the driver further comprises a current-limiting element that is an inductor connected in series with the organic electroluminescence element and the detector,
   wherein a peak value of an inrush current after the square-wave voltage is inverted to positive polarity from negative polarity is limited to a current out of emission of the organic electroluminescence element through the current-limiting element, and a term for which the inrush current is flowing is nearly constant without depending on the frequency of the square-wave voltage, and thereby light output of the organic electroluminescence element is more decreased as the frequency of the square-wave voltage is more raised.

2. The OLED driver of claim 1, further comprising an accumulator that accumulates an operation time of the organic electroluminescence element to obtain an accumulated operation time,
   wherein the controller lowers the frequency of the square-wave voltage as the accumulated operation time is increased.

3. A lighting apparatus, comprising the OLED driver and the at least one organic electroluminescence element of claim 2.

4. An adjustment method of a lighting apparatus, used for a manufacturing process of the lighting apparatus of claim 3, wherein the method comprises changing and adjusting the frequency of the square-wave voltage so that light output of the organic electroluminescence element substantially agrees with a specified light output based on a characteristic of the organic electroluminescence element.

5. A lighting apparatus, comprising the OLED driver and the at least one organic electroluminescence element of claim 1.

6. An adjustment method of a lighting apparatus, used for a manufacturing process of the lighting apparatus of claim 5, wherein the method comprises changing and adjusting the frequency of the square-wave voltage so that light output of the organic electroluminescence element substantially agrees with a specified light output based on a characteristic of the organic electroluminescence element.

7. A lighting apparatus, comprising the OLED driver and the at least one organic electroluminescence element of claim 1.

8. An adjustment method of a lighting apparatus, used for a manufacturing process of the lighting apparatus of claim 7, wherein the method comprises changing and adjusting the frequency of the square-wave voltage so that light output of the organic electroluminescence element substantially agrees with a specified light output based on a characteristic of the organic electroluminescence element.

9. The OLED driver of claim 1, further comprising a detector that substantially detects a value of an electric current flowing through the organic electroluminescence element,
   wherein based on the value of the electric current, the controller changes the frequency of the voltage so that the value of the electric current flowing through the organic electroluminescence element agrees with a target electric current value.

10. A lighting apparatus, comprising the OLED driver and the at least one organic electroluminescence element of claim 9.

11. An adjustment method of a lighting apparatus, used for a manufacturing process of the lighting apparatus of claim 10, wherein the method comprises changing and adjusting the frequency of the square-wave voltage so that light output of the organic electroluminescence element substantially agrees with a specified light output based on a characteristic of the organic electroluminescence element.

12. The OLED driver of claim 1, further comprising an accumulator that accumulates an operation time of the organic electroluminescence element to obtain an accumulated operation time,
    wherein the controller lowers the frequency of the square-wave voltage as the accumulated operation time is increased.

13. A lighting apparatus, comprising the OLED driver and the at least one organic electroluminescence element of claim 10.

14. An adjustment method of a lighting apparatus, used for a manufacturing process of the lighting apparatus of claim 13, wherein the method comprises changing and adjusting the frequency of the square-wave voltage so that light output of the organic electroluminescence element substantially agrees with a specified light output based on a characteristic of the organic electroluminescence element.

15. A lighting apparatus, comprising the OLED driver and the at least one organic electroluminescence element of claim 1.

16. An adjustment method of a lighting apparatus, used for a manufacturing process of the lighting apparatus of claim 15, wherein the method comprises changing and adjusting the frequency of the square-wave voltage so that light output of the organic electroluminescence element substantially agrees with a specified light output based on a characteristic of the organic electroluminescence element.

* * * * *